March 31, 1959
T. F. HURSEN
2,880,039
GRADUATED RELEASE TYPE BRAKE CONTROLLING VALVE WITH IMPROVED
CONTROL RESERVOIR CHARGING CONTROL
Filed Aug. 9, 1955
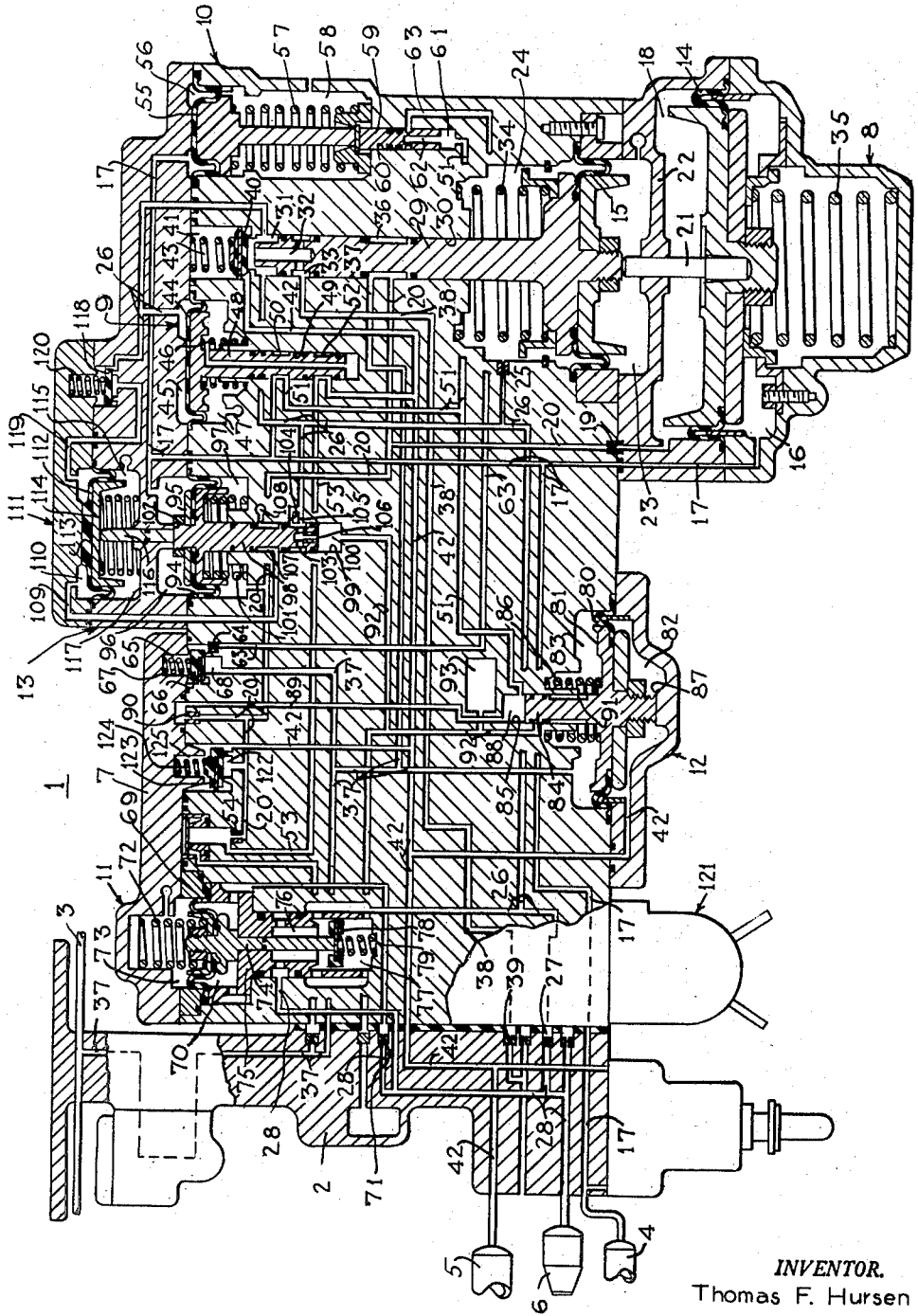
*INVENTOR.*
Thomas F. Hursen
BY
Adelbert A. Steinmiller
ATTORNEY United States Patent Office 2,880,039
Patented Mar. 31, 1959

2,880,039

GRADUATED RELEASE TYPE BRAKE CONTROLLING VALVE WITH IMPROVED CONTROL RESERVOIR CHARGING CONTROL

Thomas F. Hursen, McKeesport, Pa., assignor to Westinghouse Air Brake Company, Wilmerding, Pa., a corporation of Pennsylvania Application August 9, 1955, Serial No. 527,342

10 Claims. (Cl. 303—60)

This invention relates to fluid pressure brake apparatus of the graduated release type wherein the degree of application and release of brakes on a railway car or the like is controlled according to the degree of reduction and restoration, respectively, of pressure of fluid in a brake pipe relative to a datum pressure in a control reservoir that is charged from the brake pipe by way of a charging communication; the invention relating more particularly to an apparatus of said type embodying a novel arrangement for closing the charging communication for the control reservoir after initiation of a brake application and for reestablishing the charging communication during a brake release.

In the copending application of Glenn T. McClure, U.S. Serial No. 486,771, filed February 8, 1955, now Patent No. 2,802,701, and assigned to the assignee of the present application, there is shown and described a charging valve which responds to release of fluid under pressure from a pressure chamber to open a restricted flow connection between the brake pipe and control reservoir and operates to close said connection responsively to pressure of fluid supplied to said chamber from the brake pipe by operation of the usual quick service valve to a quick service position. With such an arrangement, the quick service valve must move to quick service position and then sufficient pressure must be obtained in the hitherto vented charging valve pressure chamber (and in the usual quick service volume then directly open to said chamber) to cause the charging valve to shift against resistance of a bias spring to a position for effecting closure of said flow connection; whereas it is desirable, when brake pipe pressure is reduced for effecting a brake application, that the control reservoir be cut off from the brake pipe even more promptly so as to minimize backflow from said reservoir into the brake pipe.

It is therefore one object of this invention to provide an improved brake apparatus of the above general type embodying a novel arrangement whereby, upon initiation of a brake application, the control reservoir is more promptly and positively disconnected from the brake pipe than in apparatus heretofore proposed.

Another object of the invention is to provide a novel arrangement wherein a flow connection between the control reservoir and brake pipe will be closed by the quick service valve responsively to movement of the latter to its quick service position upon initiation of a brake application, whereby said connection will be closed before (instead of after) a local quick service reduction in brake pipe pressure has been effected.

Another object of the invention is to provide a novel arrangement wherein a restricted flow connection between the control reservoir and brake pipe is controlled by the quick service valve and also by the charging valve, said valves being so arranged that upon initiation of a brake application the quick service valve will operate to initially close said connection and the charging valve will subsequently operate to also close said connection when brake cylinder pressure has attained a chosen value; and wherein said connection will be maintained closed during a brake release and despite return of the quick service valve to its normal position, until brake cylinder pressure has reduced to below said chosen value and causes operation of the charging valve to reopen said connection.

Other objects and advantages will become apparent from the following more detailed description of the invention and from the accompanying drawing, wherein the single figure is a diagrammatic view of a brake apparatus embodying the invention.

Description

Since many of the components of the brake apparatus embodying the invention may, for sake of illustration, be generally similar in structure and in operation with the respective types shown and described in the aforementioned copending application, the following description has been abbreviated insofar as is consistent with a clear understanding of the present invention; and only such structure as relates to the novel features of the present invention will hereinafter be described in detail. The reader is referred to the aforementioned copending application for more detailed description, if desired, of components briefly and functionally described herein.

As shown in the drawing, the improved brake apparatus comprises a brake controlling valve device 1 which is provided on each brake-equipped car of the train. This valve device 1 comprises a pipe bracket 2, to which are connected the usual brake pipe 3, a control reservoir 4, an auxiliary reservoir 5, and a brake cylinder device 6. On one face of the bracket 2 is mounted a sectionalized casing 7, within which are contained a service valve device 8, a charging valve device 9, a charging cut-off valve device 10, and a brake cylinder inshot valve device 11, all of which are substantially identical in structure and in operation with the corresponding valve devices disclosed in the aforementioned copending application. Also contained within the casing 7 are a quick service valve device 12 and a reduction insuring valve device 13, both of which differ from corresponding valve devices heretofore proposed, according to features of the invention hereinafter to be described.

The service valve device 8 may comprise two coaxially arranged, spaced apart movable abutments designated generally by the reference numerals 14, 15 and cooperably, though not positively, connected to each other so as to form a stack, as will be understood from subsequent description. The movable abutment 14 is subject at its under side, as viewed in the drawing, to pressure of fluid in a chamber 16, which is constantly open to the control reservoir 4 via a passage 17; and said movable abutment is subject at the opposite side to pressure of fluid in a chamber 18 that is constantly open by way of a stabilizing choke 19 to a passage 20 which is normally open to the brake pipe 3 by way of communication hereinafter to be described.

The movable abutment 14 is cooperably connected to the movable abutment 15 through the medium of a coaxially arranged, cylindrical pusher stem 21 that has sealing, slidably guided engagement with the wall of an aligned bore in a casing partition 22 separating chamber 18 from an atmospheric chamber 23; said stem at its respective ends engaging the movable abutments 14, 15. At the side of the movable abutment 15 opposite the chamber 23 is a chamber 24 which is constantly open to the brake cylinder device 6 by way of the usual stabilizing choke 25, a passage 26, a brake cylinder application choke 27, and a brake cylinder passage 28.

The movable abutment 15 is operably connected to a coaxially arranged cylindrical service valve 29 which projects through the chamber 24 and, adjacent its projecting end, has sealing, slidably guided engagement with the wall of an aligned bore 30 formed in the casing and open to said chamber. Adjacent its projecting end the valve 29 is of reduced diameter so as to define, in cooperation with the surrounding bore 30, an annular chamber 31; and extending inwardly from said projecting end is an axially arranged, bore-like opening 32 that is constantly open via radial apertures to an elongated annular cavity 33 formed in said valve intermediate its ends.

A helical spring 34 in chamber 24 acts on the movable abutment 15 and, through the medium of the stem 21 on the movable abutment 14, for urging the stack to the position in which it is shown in the drawing, and in which position the movable abutment 14 operatively engages, but does not compress, the usual caged helical spring 35 in the chamber 16, for thereby defining a brake release position of the service valve 29. In this position, an elongated annular cavity 36 in the valve 29 connects a branch of the passage 20 to a brake pipe passage 37 that is constantly open to the brake pipe 3. And also with valve 29 in this position, the cavity 33 is in registry with a brake cylinder release passage 38 that is constantly open to atmosphere via a release choke 39, such that the brake cylinder device 6 is then open to atmosphere by way of a branch of the passage 26, the chamber 31, opening 32, cavity 33, and said release passage 38. Also, with the valve 29 in its brake release position, the projecting end of said valve is out of engagement with a poppet-type valve 40 that controls fluid pressure communication between the chamber 31 and a chamber 41 that is constantly open to the auxiliary reservoir 5 by way of a passage 42; said valve 40 normally being held seated against an annular valve seat by the combined effects of auxiliary reservoir pressure and pressure of a helical bias spring 43 in said chamber 41 for preventing such communication.

The charging valve device 9 may comprise a movable abutment, designated generally by the reference numeral 44, subject at one side to pressure of fluid in a chamber 45 and at the opposite side to pressure of a helical bias spring 46 in an atmospheric chamber 47. The movable abutment 44 is operatively connected to a coaxially arranged cylindrical charging valve 48 that projects through the chamber 47 and adjacent its projecting end has sealing, slidably guided engagement with the wall of an aligned bore 49 in the casing.

When pressure of fluid in the chamber 45 is less than a very low value, such as about 1 p.s.i., the spring 46 is effective to cause the valve 48 to assume a charging position, in which it is shown in the drawing. In this position, an elongated annular cavity 50 formed in the valve 48 establishes connection between a branch of the control reservoir passage 17 and a passage 51 leading to the valve device 10; and elongated annular cavity 52 also formed in said valve 48 establishes connection between a branch of the auxiliary reservoir passage 42 and a passage 53 that is constantly open to a branch of the passage 20 via the usual auxiliary reservoir slow charging control choke 54.

The charging cut-off valve device 10 may comprise a movable abutment, designated generally by the reference numeral 55, subject at one side to pressure of fluid in a chamber 56 that is constantly open to the control reservoir 4 via a branch of the passage 17; said movable abutment being subject at the opposite side to pressure of a helical regulating spring 57 in an atmospheric chamber 58. The movable abutment 55 is operatively connected to a coaxially arranged, cylindrical charging cut-off valve 59 that has sealing, slidably guided engagement with the wall of an aligned bore 60 in the casing.

When control reservoir pressure as noted in the chamber 56 is below a preselected value, such as 65 p.s.i., as determined by the value of the spring 57, said spring will be effective to urge the movable abutment 55 and hence the valve 59 to a cut-in position, in which it is shown in the drawing. In this position, a branch of the passage 51 leading to a chamber 61 adjacent the projecting end of valve 59 is open via a passageway 62 in said valve to a passage 63 in the casing. The passage 63 is constantly open via a control reservoir fast charging control choke 64 to a chamber 65 at one side of a preferably disc-shaped control reservoir charging check valve 66; said check valve 66 being biased to a seated position by a helical spring 67 and control reservoir pressure in the chamber 65 against opposition of brake pipe pressure in a chamber 68 that is constantly open to a branch of the brake pipe passage 37. The check valve 66 thus prevents backflow of fluid under pressure from the control reservoir 4 into the brake pipe 3 via the passages 61, 63, but permits flow in the reverse direction as will be more clearly understood from subsequent description.

The brake cylinder inshot valve device 11 may comprise a movable abutment designated generally by the reference numeral 69 and subject at one side to pressure of fluid in a chamber 70 which is constantly open to a branch of the brake cylinder passage 28 via the usual inshot baffle choke 71; and said movable abutment is subject at the opposite side to pressure of a helical regulating spring 72 in an atmospheric chamber 73. The movable abutment 69 controls operation of a coaxially arranged, cylindrical pusher stem 74 that has sealing, slidably guided engagement with the wall of an aligned bore through a casing partition 75 separating the chamber 70 from a chamber 76 that is open to the brake cylinder device 6 via a branch of the passage 28. For controlling fluid pressure communication between the chamber 76 and a chamber 77 that is constantly open to a branch of the passage 26, there is provided a preferably disc-shaped inshot valve 78 that is urged to a seated position by a helical bias spring 79 in the chamber 77 for preventing such communication.

When brake cylinder pressure as noted in the chamber 70 is below a chosen value, such as about 9 p.s.i., the spring 72 is effective to urge the movable abutment 69 and pusher stem 74 to the positions in which they are shown in the drawing, and in which said stem abuts the inshot valve 78 and holds same unseated against resistance of the spring 79 for thereby opening the chamber 77 to the chamber 76 so that fluid under pressure may be supplied at a relatively rapid rate and in bypass of the application choke 27 to the brake cylinder device 6, for rapidly taking up slack in the brake rigging and, if preferred (as in some European countries), applying brakes to a preselected minimum degree.

The quick service valve device 12 may, for sake of illustration, comprise an annular flexible diaphragm 80 that is suitably clamped about its outer peripheral edge between sections of the casing and about its inner edge between portions of a follower assemblage 81. The diaphragm 80 is subject at one side to pressure of fluid in a chamber 82 that is constantly open to the auxiliary reservoir 5 via a branch of the auxiliary reservoir passage 42, and is subject at the opposite side to pressure of fluid in a chamber 83 that is constantly open to the brake pipe 3 via a branch of the brake pipe passage 37. Preferably formed integrally with one of the parts of the follower assemblage 81 is a coaxially arranged, cylindrical quick service valve 84 that extends through the chamber 83 and, adjacent its projecting end, has sealing slidably guided engagement with the wall of an aligned bore 85 in the casing.

When brake pipe pressure in chamber 83 is substantially equal to auxiliary reservoir pressure in the chamber 82, a helical bias spring 86 in the latter chamber is effective to urge the valve 84 to a normal position, in which it is shown in the drawing, and which position is defined by abutting contact of the follower assemblage 81 with a stop 87 formed in the end wall of chamber 82.

According to a feature of the invention, with the quick service valve 84 in normal position, the projecting end of said valve uncovers a branch of the passage 51 to a chamber 88 which is defined by the base and surrounding wall of bore 85 and is sealed off from the chamber 83, preferably by suitable O-ring type seals carried by said valve member; said chamber 88 being constantly open to a branch of the passage 20 via a passage 89 and a control reservoir combined slow charging and overcharge dissipation control choke 90, for reasons hereinafter to be explained. And also with the valve 84 in normal position, an elongated annular cavity 91 formed therein and constantly open to the chamber 83 is out of registry with a passage 92 leading to the usual quick service volume 93, for preventing flow of fluid under pressure from the brake pipe to said volume.

The quick service reduction insuring valve device 13 may, for sake of illustration, comprise an annular flexible diaphragm 94 which is suitably clamped about its outer peripheral edge between sections of the casing and about its inner edge between parts of a diaphragm follower assemblage 95. The diaphragm 94 is subject at one side to pressure of fluid in a chamber 96 that is constantly open to a branch of control reservoir passage 17; and said diaphragm is subject at the opposite side to pressure of fluid in a chamber 97 that is constantly open to a branch of the passage 20, which in turn is normally open by way of the service valve cavity 36 to the brake pipe passage 37, except under a condition not pertinent to the present invention. Preferably formed integrally with one of the parts of the diaphragm follower assemblage 95 is a coaxially arranged, cylindrical reduction insuring valve 98 that projects through the chamber 97 and adjacent its projecting end has sealing, slidably guided engagement with the wall of an aligned bore 99 in the casing. The base and surrounding wall of the bore 99 cooperate with the projecting end of the valve 98 to define a chamber 100 that is constantly open to a branch of the quick service passage 92.

A helical regulating spring 101 in chamber 97 acts on the diaphragm 94 through the medium of the follower assemblage 95 for urging the valve 98 to a normal position, in which it is shown in the drawing, and which position it is defined by engagement of a part of said assemblage with a stop 102 formed on the end wall of chamber 96. According to a feature of the invention, with the valve 98 in normal position, an elongated annular cavity 103 therein is in registry with two ports 104, 105, that open through the wall of the bore 99 and are both constantly open to a branch of the passage 26 leading to the brake cylinder device 6; said cavity 103 being constantly open to the chamber 100 by way of suitable radial ports and a central bore-like opening in said valve 98 and in which opening is suitably accommodated a so-called continued quick service reduction choke fitting 106. Also, with the valve 98 in normal position, an elongated annular cavity 107 formed therein connects an atmospheric vent port 108 in the casing to a passage 109 that leads to a chamber 110 of a fluid pressure operated loading device 111.

The device 111 may, for sake of illustration, comprise a flexible diaphragm 112 that is suitably clamped about its outer periphery between sections of the casing and is arranged coaxially with the diaphragm 94 and valve 98 of the reduction insuring valve device 13. The diaphragm 112 is subject at one side to pressure of fluid in the chamber 110 and at the opposite side to pressure of a helical spring 113 that acts on said diaphragm through the medium of a coaxially arranged diaphragm follower 114 and is disposed in an atmospheric chamber 115. Arranged coaxially with the diaphragms 112, 94 is a cylindrical pusher stem 116 that has sealing, slidably guided engagement with the wall of an aligned bore in a casing partition 117 separating the chamber 115 from the chamber 96. The spring 113 urges the diaphragm 112 to a normal position, in which it is shown in the drawing, and which position is defined by abutting engagement of the diaphragm with a suitable stop formed in the end wall of the chamber 110; it being noted that this position will be assumed when the chamber 110 is substantially devoid of fluid under pressure. With the diaphragm 112 in this position, no thrust is exerted by the diaphragm follower 114 on the pusher stem 116, so as to thereby permit movement of the reduction insuring valve 98 to its previously defined normal position.

A disc-shaped check valve 118 is interposed between a branch of passage 26 and a passage 119 open to the chamber 110 of device 111; said check valve being arranged to prevent flow of fluid from the brake cylinder device 6 via the passage 26 to the passage 119, while permitting flow in the reverse direction. The check valve 118 is subject at the side exposed to pressure of fluid in the passage 26 to pressure of a helical bias spring 120 provided to assure positive seating of said check valve.

According to another feature of the invention, the chamber 45 of the charging valve device 9 is open to a branch of the passage 26 so that operation of the charging valve 48 will be controlled by brake cylinder pressure.

Operation

With the brake apparatus devoid of fluid under pressure, all parts, except the usual manually adjustable changeover or selector valve device 121, will assume the positions in which they are shown in the drawing due to the pressures exerted by their respective springs, as will be understood from previous description; said valve device 121 being assumed to a freight position, in which it is shown, and in which it connects the passage 26 to the brake cylinder passage 28 solely via the brake cylinder application choke 27 and simultaneously connects the brake cylinder release passage 38 to the atmosphere solely via the release choke 39 so as to condition the railway car for use in freight service.

Initial charging of the brake apparatus

To initially charge the brake apparatus on the train, as well as to recharge the apparatus for effecting a release of brakes after brake application, it is customary to actuate the usual engineer's brake valve device (not shown) to a full release position to supply fluid at a relatively high pressure directly from the main reservoir on the locomotive to the brake pipe 3 at the locomotive; and then, after a period of time which varies according to different conditions, to actuate said brake valve device to a release position to thereafter supply fluid to the brake pipe at a reduced pressure, such as 71 p.s.i., corresponding to the desired normal full charge value of brake pipe pressure.

Some of the fluid under pressure thus supplied to the brake pipe 3 will, on a particular car, flow via one branch of the brake pipe passage 37 to the chamber 83 of the quick service valve device 12. And some of such fluid will flow via another branch of the passage 37 to the chamber 68 and unseat the control reservoir charging check valve 66 against resistance of the spring 67 and then flow past said check valve and at the rate controlled by the control reservoir fast charging control choke 64 to the passage 63, and thence via opening 62 in the charging cut-off valve 59 in cut-in position and through chamber 61, passage 51, cavity 50 in the charging valve 48 in charging position, and passage 17 to the control reservoir 4; the fluid flow path just described defining a control reservoir fast charge communication. Fluid under pressure thus supplied to the control reservoir passage 17 will also flow to the chamber 16 of the service valve device 8, to the chamber 56 of the charging cut-off valve device 10, and to the chamber 96 of the reduction insuring valve device 13.

Meanwhile, fluid under pressure will also flow from passage 37 through the service valve cavity 36 to the passage 20, whence it will flow to the chamber 18 of the service valve device 8 via a baffle choke 19 and also flow to the chamber 97 of the reduction insuring valve device 13. Fluid will also flow via another branch of passage 20 to a chamber 122 at one side of a preferably disc-shaped auxiliary reservoir charging check valve 123 and unseat the latter against resistance of a helical bias spring 124 in a chamber 125, and then flow at a relatively rapid rate past said check valve and via a branch of the auxiliary reservoir passage 42 to the auxiliary reservoir 5, for rapidly charging the latter to a pressure about 1.7 p.s.i. below brake pipe pressure, as determined by the bias effect of said spring 124; the fluid flow path just described defining an auxiliary reservoir fast charge communication. Some of the fluid thus supplied to the auxiliary reservoir passage 42 will flow to the chamber 82 of the quick service valve device 12 and also to the chamber 41 at one side of the valve 40 in the service valve device 8.

Meanwhile, some of the fluid under pressure supplied to the passage 20 from the brake pipe passage 37, as above described, will also flow via one branch of said passage 20 and at a relatively slow rate, as controlled by the auxiliary reservoir slow charging choke 54, through the passage 53 and cavity 52 in the charging valve 48 in charging position, to the auxiliary reservoir passage 42; the flow path just described defining an auxiliary reservoir slow charge communication. And also fluid under pressure will flow via another branch of passage 20 and at a relatively slow rate, as controlled by the control reservoir combined slow charge and overcharge dissipation choke 90 to the passage 89 and thence via chamber 88 in the quick service valve device 12 and past the projecting end of the quick service valve 84 in normal position to the passage 51, whence it will flow via the cavity 50 in the charging valve 48 in charging position to the control reservoir passage 17; the fluid flow path just described defining a control reservoir slow charge and overcharge dissipation communication.

According to a feature of the invention, this control reservoir slow charge and overcharge dissipation communication is interlocked through the quick service valve device 12 so that it may be controlled by the latter device as well as the charging valve device 9, as will be more fully understood from following description of operation.

When the control reservoir 4 and hence the chamber 56 of the charging cut-off valve device 10 has been charged to a degree where the pressure therein exceeds the aforementioned preselected value, illustratively assumed as 65 p.s.i., the movable abutment 55 will be shifted against resistance of the spring 57 and thereby carry the valve 59 to a cut-off position, in which the opening 62 is out of registry with passage 63, for thereby closing the previously defined control reservoir fast charge communication; whereupon subsequent charging of the control reservoir to equalization with brake pipe pressure will be effected solely by way of the previously defined control reservoir slow charge communication, which includes the choke 90, passages 89, 51, cavity 50 of the charging valve 48, and the passage 17. And also, when the auxiliary reservoir 5 and hence the chamber 125 has been charged to within the illustrative 1.7 p.s.i. of brake pipe pressure, the spring 124 and auxiliary reservoir pressure in said chamber will seat the auxiliary reservoir charging check valve 123 against opposition of brake pipe pressure in chamber 122, for thereby closing the previously defined auxiliary reservoir fast charge communication; whereupon subsequent charging of the auxiliary reservoir to equalization with brake pipe pressure will be effected solely by way of the previously defined auxiliary reservoir slow charge communication, which includes the choke 54, passage 53, charging valve cavity 52, and passage 42.

It is to be noted that during initial charging the brake cylinder device 6 will be maintained open to atmosphere via the service valve 29 and brake cylinder release passage 38; and consequently the chamber 45 of the charging valve device 9 and the chamber 70 of the inshot valve device 11 will be maintained vented via the vented brake cylinder device for thereby maintaining the charging valve 48 in its charging position and the inshot valve 78 open. Also, throughout initial charging the quick service valve 84 will be maintained in its normal position because auxiliary reservoir pressure in chamber 82 will never exceed the opposing brake pipe pressure in chamber 83. Moreover, the reduction insuring valve 98 will remain in its normal position throughout initial charging because control reservoir pressure in chamber 96 will never exceed opposing brake pipe pressure in chamber 97; and consequently the chamber 110 of the loading device 111 will be maintained vented via the passage 109, cavity 107 in said reduction insuring valve, and the vent port 108.

Thus, at completion of initial charging, all of the components of the brake apparatus except the charging cut-off valve 59 will be in the respective positions in which they are shown in the drawing; said valve 59 being in its cut-off position because control reservoir pressure will exceed the illustrative 65 p.s.i.

For purposes of the present invention, it is sufficient to note that in event of overcharge of the control reservoirs on the forward cars of the train due to the customary practice of initially supplying fluid under pressure to the brake pipe 3 at the locomotive directly from the main reservoir on the locomotive as above explained, such overcharge will be dissipated to the brake pipe by reverse flow through the previously defined control reservoir slow charge communication; that is, by flow from passage 17, through cavity 50 of the charging valve 48 to passage 51 and thence via chamber 88, passage 89, and choke 90, passage 20, and service valve cavity 36 to the brake pipe passage 37, such flow being at the rate controlled by said choke.

*Effecting an application of brakes*

To initiate an application of brakes, the operator actuates the aforementioned engineer's brake valve device to a service position for effecting a reduction in pressure of fluid in the brake pipe at the locomotive to a chosen value below its normal full charge value and corresponding substantially to the degree of application desired; whereupon he actuates said brake valve device to a lap position for preventing any further reduction in brake pipe pressure at the locomotive, in the manner well known in the art.

When brake pipe pressure in passage 37 and hence in chamber 83 of the quick service valve device 12 on a particular brake-equipped car is reduced a chosen degree, such as .7 p.s.i., below its normal full charge value and hence below then existing auxiliary reservoir pressure in the chamber 82, the diaphragm 80 will be deflected against resistance of spring 86 for operatively shifting the quick service valve 84 to a quick service position, defined by engagement of the follower assemblage 81 with the end wall of said chamber 83.

According to the invention, when the quick service valve 84 is in quick service position, the projecting end of said valve laps the passage 51 for closing off the latter from the passage 89 and thereby closing the previously defined control reservoir slow charge communication, so as to promptly and positively disestablish connection between the control reservoir and brake pipe; and by virtue of this arrangement, backflow of fluid under pressure from the control reservoir 4 and chamber 16 of the service valve device 8 to the brake pipe is held to a negligible minimum. Also, with the quick service valve 84 in this position, fluid under pressure will be locally released from the brake pipe 3 at a rapid rate by flow via passage 37, cavity 91, and passage 92, to the quick service volume 93, for causing an initial limited degree of local quick service reduction in brake pipe pressure. Thereafter, fluid will continue to be released from the brake pipe 3 by flow to the brake cylinder device 6 via the passage 92, chamber 100, continued quick service reduction choke fitting 106 and cavity 103 in the reduction insuring valve 98, ports 104, 105, passage 26, chamber 77 and thence past the unseated inshot valve 78 to the chamber 76 and brake cylinder passage 28 at the rate controlled by said choke, until brake pipe pressure has been reduced a chosen degree, such as about 6 p.s.i., below control reservoir pressure in the chamber 96, as determined by the value of spring 101; whereupon the diaphragm 94 will be deflected downwardly for shifting the valve 98 to a cut-off position, in which the quick service volume 93 is disconnected from the brake cylinder device 6, and in which the valve cavity 107 connects the ports 104, 105 to the passage 109 for supplying fluid at brake cylinder pressure to the chamber 110 of the loading device 111. The pressure of fluid thus supplied to the chamber 110 will cause the diaphragm 112 to deflect against resistance of the spring 113 and, through the medium of the pusher stem 116, exert thrust on the reduction insuring valve 98 for holding the latter in its cut-off position until a certain stage during a release of brakes, in the manner hereinafter to be explained. It is to be noted that the check valve 118 prevents supply of fluid under pressure from the brake cylinder device 6 to the chamber 110 in bypass of the reduction insuring valve 98, so that the loading device 111 will not exert thrust on the latter valve until it is in its cut-off position; this arrangement desirably insuring against premature operation of the reduction insuring valve to its said cut-off position before attainment of the desired continued quick service reduction in brake pipe pressure, illustratively assumed as 6 p.s.i.

Meanwhile, when brake pipe pressure in chamber 18 is reduced more than a preselected degree, such as about 3 p.s.i., below control reservoir pressure in chamber 16, (as determined by the resistance equivalent to about 2 p.s.i. of brake pipe pressure afforded by the spring 34 and resistance equivalent to about 1 p.s.i. of brake pipe pressure afforded by spring 43 and auxiliary reservoir pressure in chamber 41 acting on the valve 40) the service stack will carry the service valve 29 to a brake application position, in which the projecting end of said valve sealingly engages the valve 40 and holds the latter unseated against resistance of the spring 43 for permitting fluid under pressure to flow from the auxiliary reservoir 5 to the brake cylinder device 6 via passage 42, chamber 41, past the unseated valve 40, to chamber 31 and thence through passage 26 and past the open inshot valve 78 to the brake cylinder passage 28 in bypass of the brake cylinder application choke 27. And also with the service valve 29 in application position, the opening 32 and hence brake cylinder release passage 38 will be sealed off from the chambers 31, 41 by virtue of such sealing engagement of the valve 29 with the valve 40; and the brake pipe passage 37 will be maintained connected to the passage 20 via the valve cavity 36.

When brake cylinder pressure as noted in chamber 45 of the charging valve device 9 exceeds the illustrative 1 p.s.i., the movable abutment 44 will shift against resistance of spring 46 and carry the charging valve 48 to a cut-off position, in which the cavity 50 is out of registry with the passage 17 for secondarily closing the previously defined control reservoir slow charge communication and the cavity 52 is out of registry with the passage 53 for closing the previously defined auxiliary reservoir slow charge communication. It will be noted that the control reservoir fast charge communication will have been cut off by operation of the charging cut-off valve device 10 during initial charging, and that the auxiliary reservoir fast charge communication will be closed by operation of the charging check valve 123, which prevents backflow from the auxiliary reservoir to the brake pipe.

When brake cylinder pressure in chamber 70 of the inshot valve device 11 exceeds the illustrative 9 p.s.i., the movable abutment 69 will be shifted upwardly against resistance of the spring 72 for retracting the stem 74 so that spring 79 may seat the inshot valve 78; whereupon fluid will thereafter be supplied to the brake cylinder device 6 solely by way of, and at the rate controlled by, the brake cylinder application choke 27.

Fluid under pressure will continue to be supplied from the auxiliary reservoir 5 to the brake cylinder device 6 past the unseated valve 40 in the service valve device 8, as above described, until brake cylinder pressure, as noted (by way of passage 26 and choke 25) in the chamber 24 of said device has increased to a value substantially proportionate to the degree of operator-effected chosen reduction in brake pipe pressure; whereupon a slight further increase in brake cylinder pressure will cause the stack to be shifted in the direction of chamber 16, for thereby shifting the service valve to a lap position, intermediate its application and its release positions. With the service valve 29 in lap position, the valve 40 is seated by pressure of spring 43 for cutting off further supply of fluid to the brake cylinder device 6, and the projecting end of said valve sealingly engages the valve 40 for sealing off the exhaust opening 32 from the passage 26 leading to the brake cylinder device 6. Hence, with the service valve 29 in lap position, fluid will be bottled up in the brake cylinder device 6 at a pressure corresponding substantially to the chosen degree of reduction in brake pipe pressure.

It will thus be noted that, according to the invention, the previously defined control reservoir slow charging communication is controlled by both the quick service valve device 12 and the charging valve device 9; that, after initiation of a brake application, the quick service valve device responds to a slight, such as .7 p.s.i., reduction in brake pipe pressure below auxiliary reservoir pressure to move to a quick service position for closing said slow charge communication before brake pipe pressure is dumped into the quick service volume 93 for effecting the usual limited quick service reduction in brake pipe pressure; and that when brake cylinder pressure exceeds the illustrative 1 p.s.i., the charging valve device 9 will close the auxiliary reservoir slow charge communication and additionally or "doubly" close the already closed control reservoir slow charge communication.

*Effecting a release of brakes*

To initiate a release of brakes throughout the train, the operator causes fluid under pressure to be supplied to the brake pipe 3 at the locomotive in the manner already described in connection with initial charging. The consequent increase in brake pipe pressure in chamber 18 of the service valve device 8 on a particular car will cause the corresponding service stack to shift downwardly and thereby carry the service valve 29 to its brake release position for releasing fluid under pressure from the brake cylinder device 6 and chamber 24 to atmosphere via choke 27, passage 26, chamber 31, exhaust opening 32, passage 38, and release choke 39.

To effect a partial or graduated release of brakes, brake pipe pressure is increased a degree corresponding to the degree of brake release desired; and when brake cylinder pressure in chamber 24 has thus reduced a degree corresponding to the selected increase in brake pipe pressure, the service valve 29 will be returned to its lap position. If, however, brake pipe pressure is permitted to increase continuously to its normal full charge value, the service valve 29 will remain in brake release position for completely venting brake cylinder via the communication just described.

Meanwhile, as brake pipe pressure increases, the auxiliary reservoir 5 and hence chamber 82 of the quick service valve device 12 will be recharged from, and at substantially the same rate as, the passage 20 via the previously defined auxiliary reservoir fast charging communication, including the check valve 123; however, auxiliary reservoir pressure will be less than the pressure in passage 20 by the illustrative 1.7 p.s.i., due to the bias of spring 124. When brake pipe pressure in chamber 83 of the quick service valve device 12, as assisted by pressure of spring 86, overcomes the opposing effect on diaphragm 80 of auxiliary reservoir pressure in chamber 82, the quick service valve 84 will be returned to its normal position for cutting off the brake pipe passage 37 from the quick service volume 93 and also opening the passage 51 to the passage 89. It is to be noted, that despite this connection of the passages 51, 89, however, the control reservoir slow charge communication will nevertheless be maintained closed by the charging valve 48 (which is still in cut-off position) for thereby preventing backflow through said communication from the control reservoir 4 to the brake pipe at a time when brake pipe pressure may be considerably below its normal full charge value.

As previously noted, with the reduction insuring valve 98 in its cut-off position, chamber 110 will be opened to the brake cylinder device 6 via cavity 107 of said valve and ports 104 and 105. Hence valve 98 will be subjected to a downwardly directed force equal to the combined effect of control reservoir pressure in chamber 96 effective on diaphragm 94 and brake cylinder pressure in chamber 110 acting on diaphragm 112 and transmitted to diaphragm 94 by pusher stem 116; and valve 98 will be subjected to an upwardly directed force equal to the combined effect of brake pipe pressure in chamber 97 acting on the area of diaphragm 94 exclusive of the cross-sectional area of the cylindrical valve 98, quick service volume pressure in chamber 100 effective on the cross-sectional area of valve 98, and the pressures of the springs 101 and 113. The relative effective areas of the diaphragms 112 and 94 are such that brake cylinder pressure in chamber 110 of the loading device 111 will operatively maintain the reduction insuring valve 98 in its cut-off position until brake cylinder pressure has been reduced to a chosen value, preferably about 2 p.s.i., such as will be obtained (due to the previously described bias on the service valve stack and the relative effective areas of movable abutments 14 and 15) when brake pipe pressure has been restored to a value about 3 p.s.i. below control reservoir pressure; whereupon valve 98 will be shifted upwardly (by fluid pressures in chambers 97 and 100 and pressures of springs 101 and 113 against opposition of control reservoir pressure in chamber 96 and brake cylinder pressure in chamber 110) to a position, intermediate its cut-off and normal positions. With the reduction insuring valve 98 in intermediate position, the valve cavity 107 will maintain chamber 110 open to the brake cylinder device 6 via the port 104, and pressure of fluid in the quick service volume 93 will be released into the brake cylinder device 6 and also chamber 110 via the chamber 100, choke fitting 106, valve cavity 103 and port 105. Release of quick service volume pressure from the chamber 100 into the brake cylinder device 6 and to the chamber 110 will cause the reduction insuring valve 98 to pause in its intermediate position, in the manner and for reasons explained in the aforementioned copending application and not pertinent to the present invention; and, if brake pipe pressure is permitted to increase further, the reduction insuring valve will then be shifted on to its normal position, in which it is shown, for venting the chamber 110 of the loading device 111 via the valve cavity 107 and vent port 108.

When brake cylinder pressure as noted via passage 26 in chamber 45 of the charging valve device 9 reduces below the aforementioned low value, illustratively assumed as 1 p.s.i., the spring 46 will shift the movable abutment 44 for thereby moving the charging valve 48 to its charging position, in which the passage 51 is connected to the control reservoir passage 17 for thereby opening the previously defined control reservoir slow charge communication, and in which the passage 53 is connected to the auxiliary reservoir passage 42 for thereby opening the previously defined auxiliary reservoir slow charge communication. At the time the charging valve 48 is thus moved to its charging position, brake pipe pressure will be within a few p.s.i. of its normal full charge value, and hence within a few p.s.i. of control reservoir pressure. Backflow from the control reservoir into the brake pipe via the control reservoir slow charge communication (which includes passage 17, cavity 50, passage 51, chamber 88 of quick service valve device 12, passage 89, the control reservoir combined slow charge and overcharge dissipation control choke 90, and passage 20) will thus be negligible due to the very restricted flow capacity of said choke and the small and continually reducing pressure differential across said choke. Since auxiliary reservoir pressure will be the illustrative 1.7 p.s.i. below brake pipe pressure at the time the charging valve 48 moves to charging position, due to the pressure of spring 124 on the charging check valve 123, the auxiliary reservoir 5 will be charged from the brake pipe via the auxiliary reservoir slow charge communication (which includes the passage 20, choke 54, passage 53, cavity 52 of the charging valve 48, and auxiliary reservoir passage 42) until auxiliary reservoir pressure equalizes with brake pipe pressure; it being noted that the restricted flow rate through said choke 54 will tend to hold up pressure in the passage 20 and thereby help discourage backflow from the control reservoir into the brake pipe via the control reservoir slow charge communication.

After brakes have been completely released, the various components of the brake apparatus will once again be in the respective positions in which they are shown in the drawing, with the exception of the charging cut-off valve 59, which will be in its cut-off position; and hence all components will be in the same positions they assumed at completion of initial charging.

*Summary*

It will thus be seen that the improved brake apparatus embodies a novel arrangement whereby a restricted flow connection between the control reservoir and brake pipe is serially controlled by both the quick service valve device 12 and the charging valve device 9. According to the invention, upon initiation of a brake application, the quick service valve device responds to a slight reduction in brake pipe pressure below its normal full charge value to promptly close this flow connection before a quick service reduction in brake pipe pressure is effected; and thereafter, when brake cylinder pressure exceeds a chosen small value, the charging valve device operates to additionally close said flow connection and to maintain said flow connection closed until brake cylinder pressure is reduced to below said chosen small value during a brake release, despite intervening operation of the quick service valve device to its normal position.

Having now described the invention, what I claim as new and desire to secure by Letters Patent is:

1. In a fluid pressure brake apparatus, the combination of a normally charged brake pipe, a control reservoir, a normally open restricted charging communication connecting said control reservoir with said brake pipe, a brake cylinder, a quick service volume other than said brake cylinder, quick service means responsive to an initial preselected reduction in brake pipe pressure below its normal full charge value to close said charging communication and also open the brake pipe to said quick service volume for causing a quick service reduction in brake pipe pressure, and reduction insuring means normally opening said quick service volume to said brake cylinder and responsive to a chosen reduction in brake pipe pressure relative to control reservoir pressure to disconnect said quick service volume from said brake cylinder for terminating the quick service reduction in brake pipe pressure, said chosen reduction being greater in degree than that degree corresponding to said preselected reduction.

2. In a fluid pressure brake apparatus, the combination of a normally charged brake pipe, a reservoir, a normally open charging communication connecting said reservoir with said brake pipe, a normally vented brake controlling communication to which fluid under pressure is supplied for applying brakes and from which fluid under pressure is released for releasing brakes, and two fluid pressure actuated charging control means serially controlling flow through said charging communication and each normally positioned for permitting such flow, one of said charging control means being responsive to a slight reduction in brake pipe pressure below its normal full charge value to initially close said charging communication and then effect a local withdrawal of fluid under pressure from the brake pipe for causing a quick service reduction in brake pipe pressure, and the other of said charging control means being thereafter operable by pressure of fluid in said brake controlling communication in excess of a chosen small value to additionally close said charging communication and maintain the latter closed so long as pressure in said brake controlling communication exceeds said small value.

3. In a fluid pressure brake apparatus, the combination of a brake pipe, a control reservoir, an auxiliary reservoir, a brake cylinder, a first normally open charging communication connecting said control reservoir and brake pipe, a second normally open charging communication connecting said auxiliary reservoir and brake pipe, quick service valve means responsive to a reduction in brake pipe pressure of a slight degree below auxiliary reservoir pressure to successively close at least one of said charging communications and then effect a local withdrawal of fluid under pressure from said brake pipe for causing a quick service reduction in brake pipe pressure, charging valve means having a chamber open to said brake cylinder and responsive to pressure of fluid in said chamber in excess of a predetermined small value to close both of said charging communications, and service valve means responsive to a reduction in brake pipe pressure below control reservoir pressure in excess of a chosen degree, greater than that corresponding to said slight degree, to supply fluid under pressure from said auxiliary reservoir to said brake cylinder and responsive to a subsequent increase in brake pipe pressure to terminate such supply and release fluid under pressure from said brake cylinder.

4. In a fluid pressure brake apparatus, the combination of a normally charged brake pipe, a control reservoir, an auxiliary reservoir, a brake cylinder, a control reservoir slow charge communication leading from said brake pipe to said control reservoir, an auxiliary reservoir slow charge communication leading from said brake pipe to said auxiliary reservoir, first valve means biased to a normal position in which it is ineffective to close said control reservoir slow charge communication and responsive to a slight reduction in brake pipe pressure relative to auxiliary reservoir pressure to initially close said control reservoir slow charge communication, second valve means having a chamber open to said brake cylinder, said second valve means normally being in one position in which it is ineffective to close said control reservoir slow charge communication and auxiliary reservoir slow charge communication and responsive to pressure of fluid in said chamber in excess of a small value to close both of said communications, and service valve means responsive to a reduction in brake pipe pressure relative to control reservoir pressure in excess of a chosen degree, greater than that corresponding to said slight reduction, to supply fluid under pressure from said auxiliary reservoir to said brake cylinder and responsive to a subsequent increase in brake pipe pressure to terminate such supply and release fluid under pressure from said brake cylinder, said first valve means being operative during such subsequent increase in brake pipe pressure to return to its said normal position prior to operation of said second valve means to its said one position and said second valve means being thereupon operative to maintain both of said communications closed until pressure in such chamber reduces below said small value.

5. In a fluid pressure brake apparatus, the combination of a normally charged brake pipe, a control reservoir, an auxiliary reservoir, a brake cylinder, a control reservoir slow charge communication leading from said brake pipe to said control reservoir, an auxiliary reservoir slow charge communication leading from said brake pipe to said auxiliary reservoir, first valve means biased to a normal position in which it is ineffective to close said control reservoir slow charge communication and responsive to a slight reduction in brake pipe pressure relative to auxiliary reservoir pressure to initially close said control reservoir slow charge communication, second valve means having a chamber open to said brake cylinder, said second valve means normally being in one position in which it is ineffective to close said control reservoir slow charge communication and auxiliary reservoir slow charge communication and responsive to pressure of fluid in said chamber in excess of a small value to close both of said communications, and service valve means responsive to a reduction in brake pipe pressure relative to control reservoir pressure in excess of a chosen degree, greater than that corresponding to said slight reduction, to supply fluid under pressure from said auxiliary reservoir to said brake cylinder and responsive to a subsequent increase in brake pipe pressure to terminate such supply and release fluid under pressure from said brake cylinder.

6. In a fluid pressure brake apparatus of the type wherein application and release of brakes is controlled according to reduction and restoration, respectively, in pressure of fluid in a brake pipe relative to the pressure of fluid in a control reservoir, the combination of a quick service communication normally closed off from the brake pipe and via which fluid under pressure may be locally released from the brake pipe for causing a quick service reduction in brake pipe pressure, means defining a control reservoir fast charge communication via which fluid under pressure may flow from the brake pipe to the control reservoir at a relatively fast rate, cut-off valve means controlled by control reservoir pressure opposing a bias pressure for closing said fast charge communication when control reservoir pressure exceeds a chosen value, means defining a control reservoir slow charge communication via which fluid may flow between said brake pipe and control reservoir at a substantially slower rate for permitting control reservoir pressure to equalize with brake pipe pressure, and two fluid-pressure-actuated charging control means serially controlling flow through said slow charge communication and each normally positioned for opening said slow charge communication, one of said charging control means being responsive to an initial slight reduction in brake pipe pressure below normal charge value to close said slow charge communication and open the brake pipe to said quick service communication, and the other of said charging control means being thereafter operable while the brakes are applied to secondarily close said slow charge communication so that the latter will be maintained closed until both of said charging control means have returned to their respective normal positions.

7. The combination according to claim 6, wherein said other charging control means cooperates with said cut-off valve means to serially control flow through said fast charge communication such that said fast charge communication and said slow charge communication are both closed by said other charging control means while brakes are applied.

8. In a fluid pressure brake apparatus, the combination of a normally charged brake pipe, a reservoir, means defining a normally open restricted communication through which fluid under pressure may flow between said brake pipe and reservoir for permitting equalization of fluid pressures in said brake pipe and reservoir, means defining a quick service communication normally closed off from the brake pipe and via which fluid under pressure may be locally released from the brake pipe for causing a quick service reduction in brake pipe pressure, and a valve device comprising a movable abutment and valve means coaxially and operatively connected to said movable abutment, said movable abutment being responsive to a reduction in brake pipe pressure in excess of a chosen slight degree below its normal full charge value to cause said valve means to close said restricted communication and open the brake pipe to said quick service communication, whereby both of the aforesaid communications will be concurrently controlled by said valve means as, in turn, controlled by said movable abutment.

9. A fluid pressure brake apparatus comprising a normally charged brake pipe, a control reservoir, means defining a normally open charging communication via which fluid under pressure may flow between the brake pipe and the control reservoir, means defining a quick service venting communication normally closed off from the brake pipe and via which fluid under pressure may be locally released from the brake pipe, a valve device comprising a movable abutment and valve means coaxially and operatively connected to said movable abutment, said movable abutment being responsive to an initial slight reduction in brake pipe pressure below normal charge value to cause said valve means to operate to close said charging communication and open the brake pipe to said quick service venting communication, whereby both of the aforesaid communications will be concurrently controlled by said valve means as in turn controlled by said movable abutment, and service valve means responsive to a reduction in brake pipe pressure, greater than said slight reduction, relative to control reservoir pressure to cause a brake application.

10. A fluid pressure brake apparatus comprising a normally charged brake pipe, a normally charged auxiliary reservoir, a control reservoir, a brake cylinder, means defining a normally open restricted communication for permitting fluid flow between the brake pipe and the control reservoir, means defining a quick service communication normally closed off from the brake pipe and via which fluid under pressure may be locally released from the brake pipe, a valve device comprising a movable abutment and valve means coaxially and operatively connected to said movable abutment, said movable abutment being responsive to a slight reduction in brake pipe pressure relative to auxiliary reservoir pressure to cause said valve means to be actuated to successively close said restricted communication and then open said quick service communication for effecting a local withdrawal of fluid under pressure from the brake pipe, whereby both of said communications will be concurrently controlled by said valve means as in turn controlled by said movable abutment, and service valve means responsive to a reduction in brake pipe pressure, greater than said slight reduction, relative to control reservoir pressure to supply fluid under pressure from the auxiliary reservoir to the brake cylinder for effecting a brake application.

References Cited in the file of this patent

UNITED STATES PATENTS

| | | |
|---|---|---|
| 1,890,088 | Kasantzeff | Dec. 6, 1932 |
| 2,071,741 | Gnavi | Feb. 23, 1937 |
| 2,276,927 | Christen | Mar. 17, 1942 |